(12) United States Patent
Kohnen

(10) Patent No.: US 6,637,005 B1
(45) Date of Patent: Oct. 21, 2003

(54) TRIPLE REDUNDANT SELF-SCRUBBING INTEGRATED CIRCUIT

(75) Inventor: Kirk Kohnen, Fullerton, CA (US)

(73) Assignee: Hughes Electronics Corporation, El Sequndo, CA (US)

( * ) Notice: Subject to any disclaimer, the term of this patent is extended or adjusted under 35 U.S.C. 154(b) by 0 days.

(21) Appl. No.: 09/516,260

(22) Filed: Feb. 29, 2000

(51) Int. Cl.[7] .................. G06F 11/08; H03K 19/003
(52) U.S. Cl. ............................ 714/797; 326/11
(58) Field of Search ................ 714/5, 6, 797; 326/11, 14, 35; 327/198

(56) References Cited

U.S. PATENT DOCUMENTS

| | | | |
|---|---|---|---|
| 4,375,683 A | * 3/1983 | Wensley | 714/12 |
| 5,031,180 A | 7/1991 | McIver et al. | |
| 6,085,350 A | * 7/2000 | Emmert et al. | 714/797 |
| 6,127,864 A | * 10/2000 | Mavis et al. | 327/144 |

* cited by examiner

*Primary Examiner*—Albert Decady
*Assistant Examiner*—Matthew C. Dooley
(74) *Attorney, Agent, or Firm*—Terje Gudmestad

(57) ABSTRACT

A fault tolerant integrated circuit employs triple redundant storage of data and continuous voting to protect the data from Single Event Upset, or SEU. The integrated circuit includes three or more registers and a majority voter. The three registers are connected in series to each other with the output of the first register being connected to the input of the second register and the output of the second register being connected to the input of the third register. The majority voter is connected to the output of each register and generates a signal corresponding to the majority of all of the register outputs. The output of the majority voter is connected to the input of the first register, thereby correcting any incorrect data stored in the registers.

14 Claims, 1 Drawing Sheet

TRIPLE REDUNDANT SELF-SCRUBBING INTEGRATED CIRCUIT

TECHNICAL FIELD

The present invention relates generally to fault tolerant devices, and more particularly, to a triple redundant self-scrubbing integrated circuit.

BACKGROUND ART

Integrated circuits (IC's) used in computers and other electronic systems aboard space vehicles are susceptible to a phenomenon known as Single Event Upset, or SEU. Single Event Upset occurs when radiation passing through an integrated circuit deposits stray charges in the device, causing one of its registers to be disrupted.

One technique for reducing Single Event Upset is to encode the contents of the registers with some type of error correction. However, conventional error correction techniques require a "scrubbing" process, in which the data is frequently read out from a register, corrected, re-encoded and restored in the register. This scrub cycle interrupts the normal use of the register and, if multiple errors occur between scrub cycles, the scrubbing process may not be successful in correcting the errors.

U.S. Pat. No. 5,031,180 discloses a triple redundant fault-tolerant register. This approach has the annantage of being "self-scrubbing," i.e., an SEU cannot force a permanent change in the state of any storage element within the register. However, implementation of this approach is more efficient with the cooperation of a semi-custom integrated circuit vendor. This is because, in order to use the method of U.S. Pat. No. 5,031,180, the invention is best designed into a semi-custom library element by an integrated circuit vendor.

The disadvantages associated with these conventional fault protection techniques have made it apparent that a new technique for protecting IC registers from Single Event Upset is needed. Preferably, the new technique is self-scrubbing. The new technique also should not require a large increase in circuit area.

SUMMARY OF THE INVENTION

It is, therefore, an object of the invention to provide an improved and reliable triple redundant self-scrubbing integrated circuit. Another object of the invention is to provide a Single Event Upset resistant device that does not require semi-custom integrated circuits.

In one embodiment of the invention, a fault tolerant integrated circuit employs triple redundant storage of data and continuous voting to protect the data from Single Event Upset, or SEU. The integrated circuit includes three or more registers and a majority voter. The three registers are connected in series to each other with the output of the first register being connected to the input of the second register and the output of the second register being connected to the input of the third register. The majority voter is connected to the output of each register and generates a signal corresponding to the majority of all of the register outputs. The output of the majority voter is connected to the input of the first register, thereby correcting any incorrect data stored the registers.

The present invention thus achieves an improved triple redundant self-scrubbing integrated circuit. The present invention is advantageous in that it does not require the generation of any new library elements, yet it is self-scrubbing.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
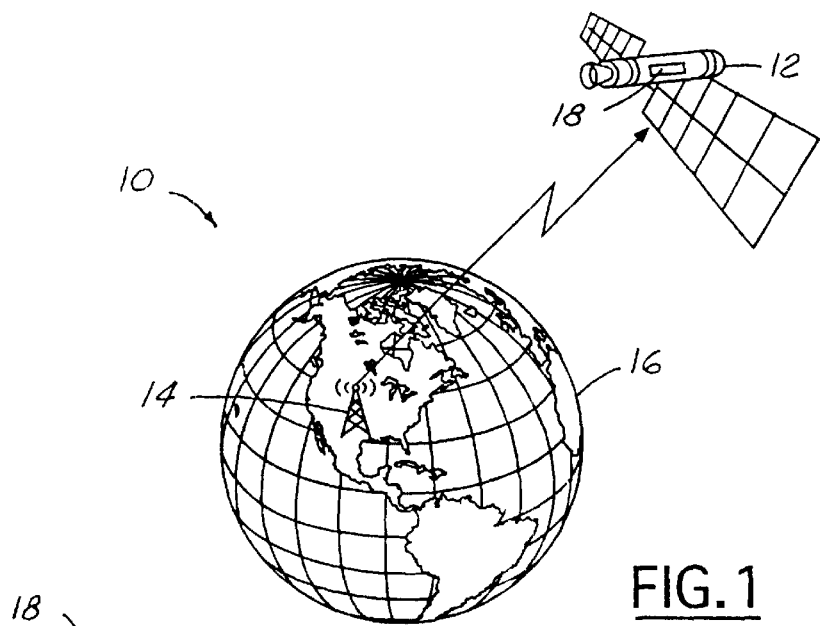
FIG. 1 depicts a satellite system in which a fault tolerant integrated circuit in accordance with the present invention may be utilized.

Referring to FIG. 1, a satellite system 10 in which a fault tolerant integrated circuit in accordance with present invention can be utilized is illustrated. The satellite system 10 is comprised of one or more satellites 12 which are in communication with a ground station 14 located on the Earth 16. Each satellite 12 contains one or more fault tolerant integrated circuit 18.

The satellite system 10 is responsible for protecting data from Single Event Upset, or SEU. Integrated circuits used in computers and other electronic systems aboard space vehicles are susceptible to a phenomenon known as Single Event Upset, or SEU. Single Event Upset occurs when radiation passing through an integrated circuit deposits stray charges in the device, causing one of its registers to be disrupted. Several fault protection techniques can be utilized to reduce the number of SEU's that occur in the integrated circuits used aboard space vehicles, but these conventional techniques have several disadvantages.

Figure 2:
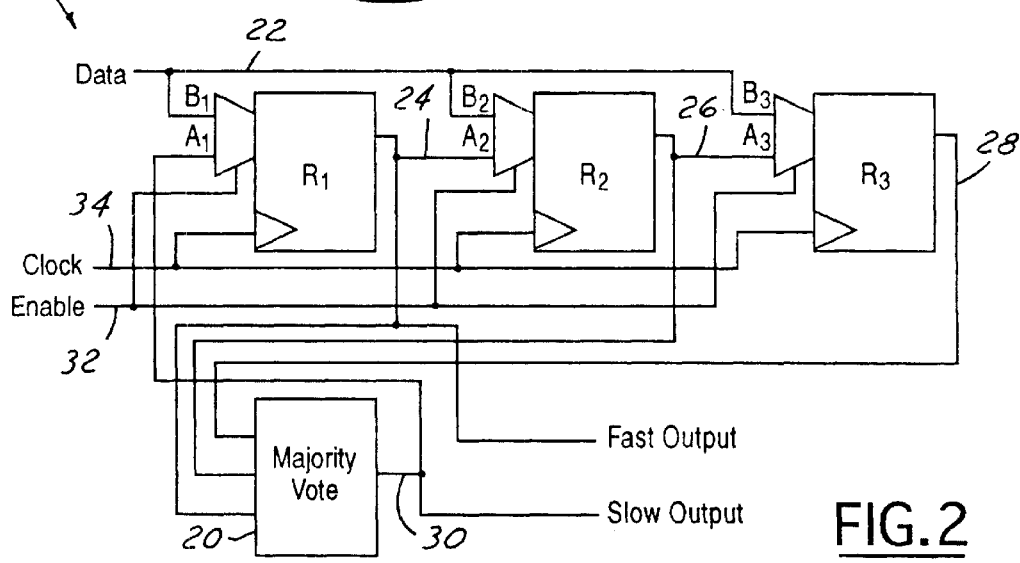
FIG. 2 schematically illustrates a fault tolerant integrated circuit in accordance with a preferred embodiment of the present invention.

Referring to FIG. 2, a schematic of a fault tolerant integrated circuit 18 in accordance with a preferred embodiment of the present invention is illustrated. Fault tolerant integrated circuit 18 includes three registers $R_1$, $R_2$, and $R_3$ and a majority voter 20. Each register includes two inputs, A and B, and a single output. First register $R_1$ includes a first input $A_1$, a first output, and a fourth input $B_1$. Second register $R_2$ includes a second input $A_2$, a second output, and a fifth input $B_2$. Third register $R_3$ includes a third input $A_3$, a third output, and a sixth input $B_3$. Majority voter 20 includes a plurality of voter inputs and a voter output. In another embodiment of the present invention, one or more forth registers, having fourth outputs, may be used. One skilled in the art would recognize that an odd number of registers, i.e., three, five, seven, etc., is more efficient then an even number of registers.

Fault tolerant integrated circuit 18 includes a plurality of lines for connecting various components. A data signal, on line 22, is applied in parallel to fourth, fifth and sixth inputs $B_1$, $B_2$ and $B_3$. The first output of first register $R_1$, on line 24, is applied to second input $A_2$ and to one of the plurality of voter inputs. The second output of second register $R_2$, on line 26, is applied to third input $A_3$ and to one of the plurality of voter inputs. The third output of third register $R_3$, on line 28, is applied to one of the plurality of voter inputs. The voter output of majority voter 20, on line 30, is applied to first input $A_1$ and corresponds to a majority of the first, second, and third outputs on lines 24, 26, and 28.

Transfer of data from either the A or B input to the register output is accomplished through the use of an enable signal and a clock signal. The enable signal, on line 32, is applied in parallel to first, second, and third registers $R_1$, $R_2$, and $R_3$ for activating the A inputs when the enable signal is inactive and activating the B inputs with the enable signal is active. The clock signal, on line 32, is applied in parallel to first, second, and third registers $R_1$, $R_2$, and $R_3$ and drives each register to transfer data from its active input, as determined by the enable signal, to each register's output whenever the clock signal transitions from low to high.

Depending on system requirements, the present invention may supply a fast output or a slow output. The first output, on line 24, is updated shortly after the clock signal transitions from low to high and may therefore be used as a fast output. The voter output, on line 30, takes more time to update its value after the clock signal transitions from low to high and may therefore be used as a slow output.

In operation, when the enable signal is active, i.e., the circuit is being loaded; the B inputs of all three registers receive the data signal on line 22. When the clock signal transitions from low to high, the registers are updated with the new input value. The value is immediately fed to the first output, or fast output, on line 24. After all three register outputs propagate through the majority voter 20, the voter output, or slow output, is set.

Figure 3:
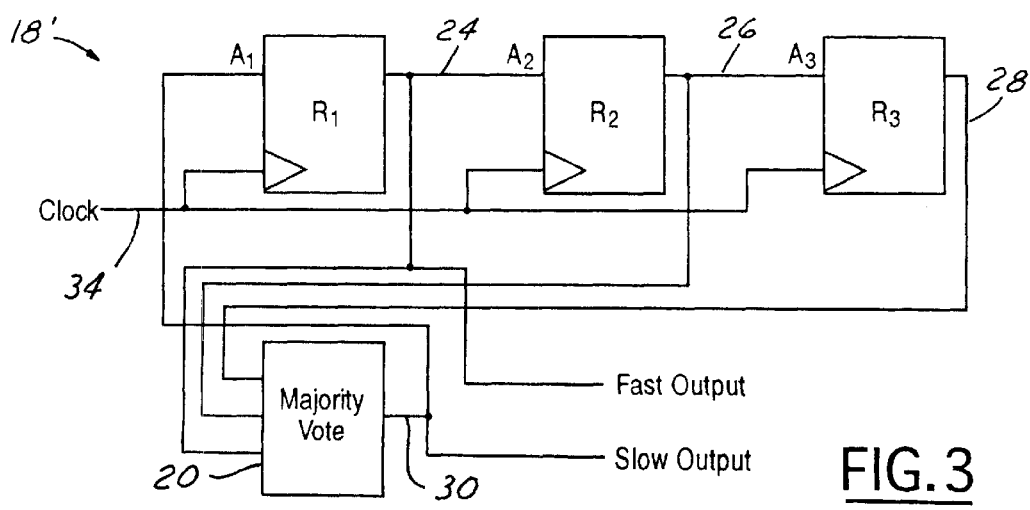
FIG. 3 schematically illustrates an equivalent fault tolerant integrated circuit with an unasserted load enable signal in accordance with a preferred embodiment of the present invention.

When the enable signal is inactive, fault tolerant integrated circuit 18 effectively operates as shown in FIG. 3, a schematic of an equivalent fault tolerant integrated circuit with an unasserted load enable signal 18' in accordance with a preferred embodiment of the present invention. When the enable signal is inactive, then the three registers $R_1$, $R_2$, and $R_3$ are tied together so that the voter output, on lines 24, 26, and 28, of all three registers $R_1$, $R_2$, and $R_3$, feeds the first input $A_1$ of first register $R_1$ on line 30. Similarly, the first output of first register $R_1$ feeds second input $A_2$ of the second register $R_2$, on line 24, and the second output of the second register $R_2$ feeds the third input $A_3$ of the third register $R_3$, on line 26.

If all registers $R_1$, $R_2$ and $R_3$ are at the same binary value (0 or 1) then they will stay at this value. However, if one of the registers is upset by an SEU, the output of one of the registers $R_1$, $R_2$, and $R_3$ will be different from the other two. Majority voter 20 will then correct the incorrect value, because a majority of the outputs are still correct. The correct value will then propagate through each register R, $R_2$, and $R_3$ with the upset value moving to higher valued registers with each clock signal cycle on line 34 until all three registers are corrected. One skilled in the art would recognize that one or more fifth registers might be added in a similar fashion to protect against multiple SEUs. Additionally, because the majority voter only feeds one register, if it receives an SEU, only the first register can be upset as a result, and the error will be flushed out.

From the foregoing, it can be seen that there has been brought to the art a new and improved triple redundant self-scrubbing integrated circuit. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A fault tolerant integrated circuit comprising:

first register having a first input and a first output having a fast output coupled thereto;

second register having a second input and a second output, said second input coupled to said first output;

a third register having a third input and a third output, said third input coupled to said second output; and majority voter having a plurality of voter inputs and a voter output, said plurality of voter inputs coupled to said first, second, and third outputs, said voter output coupled to said first input, wherein said voter output corresponds to a majority of said first, second, and third outputs, thereby correcting any incorrect data stored in said first, second, or third registers.

2. The fault tolerant integrated circuit as recited in claim 1, further comprising one or more fourth registers coupled in series to said third output, said fourth registers coupled in parallel to said plurality of voter inputs, wherein said voter output corresponds to a majority of said first, second, third, and one or more fourth outputs.

3. The fault tolerant integrated circuit as recited in claim 1, further comprising a clock signal for driving said first, second, and third registers, wherein said first, second, and third registers store data based upon the stat of said clock signal.

4. The fault tolerant integrated circuit as recited in claim 1, wherein said first register has a fourth input, said second register has a fifth input, and said third register has a sixth input.

5. The fault tolerant integrated circuit as recited in claim 4 wherein said fourth, fifth, and sixth inputs are coupled in parallel to a data signal.

6. The fault tolerant integrated circuit as recited in claim 4, further comprising an enable signal activating a first, second and third inputs when said enable signal is inactive, said enable signal activating said fourth, fifth, and sixth inputs when said enable signal is active.

7. The fault tolerant circuit as recited in claim 1, further comprising a slow output coupled to said voter output.

8. A satellite fault tolerant integrated circuit system comprising:

a ground station;

a satellite in orbit and in communication with said ground station, said satellite having a fault tolerant integrated circuit comprising:

a first register having a first input and a first output having a fast output coupled thereto;

a second register having a second input and a second output, said second input coupled to said first output;

a third register having a third input and a third output, said third output coupled to said second output; and a majority voter having a plurality of voter inputs and a voter output, said plurality of voter inputs coupled to said first, second, and third outputs, said voter output coupled to said first input, wherein said voter output corresponds to a majority of said first, second, and third outputs, thereby correcting any incorrect data stored in said first, second, or third registers.

9. The satellite fault tolerant integrated circuit system as recited in claim 8 further comprising one or more fourth registers coupled in series to said third output, said fourth registers coupled in parallel to said plurality of voter inputs, wherein said voter output corresponds to a majority of said first, second, third, and one or more fourth outputs.

10. The satellite fault tolerant integrated circuit system as recited in claim 8, further comprising a clock signal for driving said first, second, and third registers, wherein said first, second, and third registers store data based upon said clock signal.

11. The satellite fault tolerant integrated circuit system as recited in claim 8, wherein said first register has a fourth input, said second register has a fifth input, and said third register has a sixth input.

12. The satellite fault tolerant integrated circuit system as recited in claim 11, wherein said fourth, fifth, and sixth inputs are coupled in parallel to a data signal.

13. The satellite fault tolerant integranted circuit system as recited in claim 11, further comprising an enable signal activating said first, second and third inputs when said enable signal is inactive, said enable signal activating said fourth, fifth and sixth inputs when said enable signal is active.

14. The satellite fault tolerant integrated circuit system as recited in claim 8, further comprising a slow output coupled to said voter output.

* * * * *